United States Patent [19]

Koch et al.

[11] Patent Number: 5,460,635
[45] Date of Patent: Oct. 24, 1995

[54] MAGNESIUM OXYCHLORIDE CEMENT CONTAINING GRAPHITE

[75] Inventors: James P. Koch; Allen T. Donahue, both of Janesville, Wis.

[73] Assignee: Western Atlas Inc., South Benoit, Ill.

[21] Appl. No.: 99,316

[22] Filed: Jul. 30, 1993

[51] Int. Cl.⁶ .................................................. B24D 3/02
[52] U.S. Cl. ............................ 51/307; 51/308; 51/309; 106/688; 501/101
[58] Field of Search ........................... 51/307, 293, 308, 51/309; 106/688; 501/101

[56] References Cited

U.S. PATENT DOCUMENTS

| | | | |
|---|---|---|---|
| 1,483,854 | 2/1924 | Stean | 51/309 |
| 1,504,697 | 8/1924 | Menard | 51/308 |
| 3,062,633 | 11/1962 | Coes, Jr. | 51/295 |
| 3,442,669 | 5/1969 | Osterholtz | 501/101 |
| 3,718,447 | 2/1973 | Hibbs, Jr. et al. | 51/295 |
| 3,779,727 | 12/1973 | Siqui et al. | 51/295 |
| 3,868,233 | 2/1975 | Carver et al. | 51/309 |
| 4,157,897 | 6/1979 | Keat | 51/295 |
| 4,308,035 | 12/1981 | Danikova et al. | 51/298 |
| 4,334,895 | 6/1982 | Keat | 51/309 |
| 4,378,233 | 3/1983 | Carver | 51/309 |
| 4,912,068 | 3/1990 | Michael et al. | 501/101 |
| 5,030,282 | 7/1991 | Matsuhashi et al. | 106/695 |
| 5,262,367 | 11/1993 | Sundell | 501/101 |

OTHER PUBLICATIONS

Hackh et al, *Chemical Dictionary*, 1987, p. 348.

*Primary Examiner*—Deborah Jones
*Attorney, Agent, or Firm*—Hoffman, Wasson & Gitler

[57] ABSTRACT

Magnesium oxychloride cement bonds are improved by incorporation of graphite. The graphite not only contributes to cooler dry grinding with abrasive tools based on the magnesium oxychloride bond, but unexpectedly also improves heat strength of the bond.

39 Claims, No Drawings

5,460,635

MAGNESIUM OXYCHLORIDE CEMENT CONTAINING GRAPHITE

BACKGROUND OF THE INVENTION

1. Field of Art

Magnesium oxychloride cement has been used as a bonding agent since early in the twentieth century. While processes for preparing magnesium oxychloride cement bonds are well-known in the art, the chemistry of these processes and products is not fully understood to this day. The cement is a complex reaction product of calcined magnesium oxide, magnesium chloride, and water, which is admixed in conventional proportions and allowed to cure or harden into a cement variously designated in the industry as "magnesite cement", "magnetic cement", "Sorel cement", "French cement", and other terms.

Curable magnesium oxychloride cement compositions broadly range from castable mixes to mixes that are quite stiff and are tamped into molds. While the invention described herein is applicable to compositions encompassing at least this broad range of formulations, it is particularly applicable to the latter compositions, those that are stiff, and tamped or otherwise compacted into a mold such as a wheel mold, wherein they are cured to provide the desired shaped product.

Magnesium oxychloride cement has particular application in the production of abrasive tools used for grinding, especially abrasive wheels. These wheels are typically prepared as known in the art by admixing the bond precursors with abrasive grit and optional additives, molding the mixture into a wheel shape by the above-described tamping operation, and curing the mixture to harden the bond components into a magnesium oxychloride cement bond containing abrasive grit material of a type and amount suitable for the contemplated grinding application.

The product has grinding characteristics eminently suitable for dry grinding applications. Unfortunately, the magnesium oxychloride cement bond is quite brittle and has a low coefficient of thermal expansion, and the strength of the magnesite bond can rapidly deteriorate under the heat generated during dry grinding. The cause of this is not clear; however, dehydration of the oxychloride bond may be at least partially responsible.

Loss of heat strength may lead to cracking of the bonding cement. Abrasive magnesium oxychloride cement wheels are large and very heavy, and cracking of these wheels can result in premature failure of the wheel. Further, heat build-up during dry grinding contributes to metallurgical changes in metal substrate materials such as coil springs which, if sufficiently profound, result in visible burning of the product and an unacceptable product quality.

2. Discussion of Related Art

Traditionally, liquid coolants, often fortified with lubricant material, are employed to dissipate heat engendered in various grinding processes to protect both the abrasive tool and brittle or otherwise susceptible substrates from heat damage. Wet grinding applications employing liquid coolants are not, however, suitable for use in conjunction with magnesium oxychloride cement-bonded abrasive tools. Liquid coolants of the type commonly used in conjunction with wet grinding operations to dissipate heat build-up during grinding nearly always contain water, which softens and dissolves the magnesium oxychloride bond and causes rapid deterioration of the tool. Further, certain industrially-important substrates, notably the above-mentioned coil springs, do not lend themselves to wet grinding processes, which promote rusting of metal workpieces and impaction of swarf in the workpiece. Accordingly, such substrates are commonly dry-ground. As a result, magnesium oxychloride cement-bonded abrasive wheels or other abrasive tools are used almost exclusively for dry grinding applications, particularly for dry-grinding of water-sensitive substrate material such as coil springs. As discussed above, a rapid loss of bond strength typically accompanies the heat build-up characteristic of dry-grinding, and such abrasive tools are at risk of developing deep cracks under the heat generated during grinding, which may be followed by disintegration of the tool.

The incorporation of lubricants such as graphite into grinding tools is well-known. For example, U.S. patents U.S. Pat. No. 1,483,854 to Stern; U.S. Pat. No. 1,504,697 to Menard; U.S. Pat. No. 3,062,633 to Coes, Jr.; U.S. Pat. No. 3,718,447 to Hibbs, Jr. et al.; U.S. Pat. No. 3,868,233 to Carver, et al.; U.S. Pat. No. 3,779,727 to Siqui, et al.; U.S. Pat. No. 4,157,897 to Keat; U.S. Pat. No. 4,308,035 to Danilova et al.; U.S. Pat. No. 4,334,895 to Keat; U.S. Pat. No. 4,378,233 to Carver; and U.S. Pat. No. 5,030,282 to Matsuhashi et al.; all provide exemplary teachings of graphite or other lubricant in various grinding tool compositions. Stern; Coes, Jr: Hibbs, Jr; Siqui, et al.; Carver, et al.; and Danilova et al. describe abrasive materials comprising organic resin binders and solid lubricants such as graphite. Danilova, et al. disclose an abrasive material comprising mineral and organic binders and an antifriction material. The Keat and Carver patents are variously directed to ceramic-, glass-, or metal-bonded abrasive tools containing a dry film lubricant such as graphite. However, none of these references suggests the use of graphite in combination with magnesium oxychloride cement bonds.

It has been known for the decades that magnesium oxychloride cement has been in use as a bonding agent for abrasives in grinding applications that this bond is highly sensitive to the incorporation of extraneous materials, which in additive-effective amounts often weaken bonding of the cement precursors to the point of providing a commercially useless product. As noted above, the chemistry of the magnesium oxychloride cement bond is not clearly understood, and addition of extraneous materials to the basic combination of calcined magnesium oxychloride, magnesium chloride, and water with a view toward improving the formulation has of necessity proceeded on an ad hoc basis. Many additives have been suggested for improvement of grinding tools based on bonding agents such as Portland cements, vitrified bonds, or resinous materials such as phenol formaldehyde-based resins to promote structural strength or other characteristics of the product grinding tools. However, in combination with the present magnesium oxychloride cement precursors, such additives in effective amounts have frequently proved to be deleterious to the magnesium oxychloride bond, often weakening the bond structure of the product to the point of uselessness for the intended grinding application.

SUMMARY OF THE DISCLOSURE

The invention accordingly comprises an improved magnesium oxychloride cement bond including a graphite component. In particular, the invention comprises an abrasive composition comprising magnesium oxychloride cement precursors, abrasive grit, and graphite, which can be cured to provide an abrasive tool. Unexpectedly, the amount of graphite incorporated into the composition for effective dissipation of heat build-up during dry grinding of substrate material with tools employing the graphite-loaded magnesium oxychloride cement bond does not weaken the strength of the bond. To the contrary, graphite in lubricant-effective amounts has surprisingly proved capable of not only dissipating heat-of-friction build-up during anhydrous grinding applications which would ordinarily be damaging to the tool and/or substrate, but also of improving, rather than weakening, the magnesium oxychloride cement bond, particularly with regard to heat strength. The product is an exceptionally useful dry-grinding tool, especially an abrasive wheel.

DETAILED DESCRIPTION OF THE INVENTION

According to the invention, graphite is added to a conventional magnesium oxychloride cementitious bonding composition essentially comprising calcined magnesium oxide, magnesium chloride, and water, to form a plastic, settable (curable) composition suitable for the intended use. Formulations for such magnesium oxychloride cementitious compositions and curing conditions are well-known in the art; the present invention is directed to the improvement in the hardened final products afforded by the presence of the graphite component. While abrasive tools comprising graphite-loaded magnesium oxychloride cement bonds containing abrasive grits are particularly contemplated, especially for the improved lubricating and heat strength characteristics of the product in dry-grinding applications, the strengthening qualities of graphite on magnesium oxychloride cement bonds generally also can improve other magnesium oxychloride cement products and processes employing these products.

The graphite is chemically inert toward the magnesium oxychloride cement precursors, and has no noted deleterious effects on the product cement, even in large amounts. Owing to the slipperiness of the graphite, less heat of friction is generated during dry grinding operations. Further, graphite is heat-conductive, and an effective dissipator of this heat even in small amounts.

Graphite suitable for incorporation with the magnesium oxychloride cement precursors (i.e., the plastic, settable admixture of magnesium oxychloride/magnesium chloride/water, herein also referred to as the "magnesium oxychloride cementitious composition") broadly comprises finely divided particles of various commercially available graphites.

An example of suitable graphite particles comprises high purity (for example, from about 80 to about 100% purity) crystalline graphite flakes from about 15 to 200 microns (numerical average particle size, based on the average of the longest and shortest dimensions of the flakes), or about 300 mesh (ANSI screen) or finer. Such flakes are obtainable from various suppliers, such as the Superior Graphite Co., Chicago, Ill., USA, which markets 100% natural graphite in various flake sizes.

Flake sizes are selected for good workability of the cementitious composition. While finer graphite particles as above are preferred for good dispersion with the magnesium oxide component (which is typically about 200 mesh and finer), coarser particles may improve workability of mixtures having a high graphite content. In particular, particles coarser than about 300 mesh, for example from about 50 to 150 mesh, are recommended as desirable to improve workability of cementitious compositions relatively heavily loaded with graphite.

The amount of graphite to be added according to the present invention is conveniently calculated on a weight basis against the amount of calcined magnesium oxide component present in the cementitious composition. Since the graphite is chemically inert and has no apparent effect on the curing process of the magnesium oxychloride cementitious composition, the amount added is of wide range and primarily determined by the properties desired in the cement product. As little as about 5% by weight graphite based on the weight of calcined magnesium oxide provides a significant improvement in heat strength of the bond. The graphite content may be increased as necessary up to, for example, about equal parts by weight graphite and calcined magnesium oxide for the desired results, such as effective cooling (e.g., reduction and dissipation of heat-of-friction build-up) during particular dry grinding applications, or for increased strength of the magnesium oxychloride bond. Incorporation of graphite in amounts up to about 50% by weight of calcined magnesium oxide has been found to have no significant adverse effect on the product magnesium oxychloride cement bond. To the contrary, graphite appears to improve the bond structure of the cement product so that it retains a higher percentage of its heat strength when heated.

For dry-grinding applications with magnesium oxychloride cement-bonded tools according to the present application, amounts of graphite sufficient to maximize performance of the tool without significant loss of integrity of the bond are recommended; from about 10 to 30% wt % graphite, based on the weight of magnesium oxychloride present, will often be suitable. However, different grinding applications may require lower or higher concentrations of graphite for optimum results, and such concentrations are within the scope of the present invention. Up to at least about 10% by weight graphite (by weight of magnesium oxide) may be included in basic formulations of magnesium oxychloride cement compositions according to the art without adjustment of the amounts of other ingredients; however, as described below, it may be desirable to at least partially substitute graphite in excess of about 10 wt% magnesium oxide for about equal parts by weight magnesium oxide and/or filler components such as clay in the basic formulation to maintain integrity of the bond.

The magnesium oxychloride cementitious composition is readily prepared from commercially available materials as known in the art. Magnesium oxide powder is typically combined with an aqueous solution of magnesium chloride in proportions which give the desired consistency to the mix and the desired product. Exemplary useful ingredients include substantially pure calcined magnesium oxide powder admixed with an aqueous solution of magnesium chloride, for example from about 15 to 30 wt% $MgCl_2$ in amounts of about equal parts by weight of solution and powder up to an excess of the magnesium chloride solution of about 10 to 15% by weight of the calcined MgO. This admixture can of course be supplemented with water to modify the consistency of the cementitious mix as desired. Particularly useful sources of magnesium chloride for the magnesium oxychloride cementitious compositions of the invention are solutions marketed by Dow Chemical, Midland, Mich. USA such as L-30 (aqueous magnesium chloride, 30 degrees Baumé).

Other components can be added to the mix as desired as known in the art, insofar as such additives do not substantially weaken the magnesium oxychloride bond. Any such additives are generally selected according to the intended use of the product. For example, in applications requiring substantial flexural strength in the magnesium oxychloride cement product, aluminum-silicate clays such as kaolin, or aggregates are frequently added (usually in flake form) to strengthen the bond, typically in amounts of from about 5 to 75 parts by wt% MgO. For abrasive tool applications, suitable abrasive grits such as silicon carbide, aluminum oxide, sol-gel aluminum oxide, or glass frit are incorporated as customary in the art. Pigments, as another example, may also be included wherein visual qualities are of importance. Additives such as fillers and grain spacers are further exemplary, with the proviso that any such additives do not substantially compromise the integrity of the magnesium oxychloride bond.

For general use, the graphite component is conveniently admixed with the calcined magnesium oxide powder, and the remaining cement precursors are then incorporated according to methods recognized in the art. Typically, any dry additives such as clay, abrasives, or fillers are admixed with the magnesium oxide powder and graphite, followed by gradual incorporation of the liquid ingredients (including magnesium chloride if added as aqueous solution) with thorough mixing to form a homogeneous lump-free mass. The mixture is then allowed to set and harden in a customary way.

In a particular embodiment of the application, graphite is incorporated into a magnesium oxychloride cementitious material formulated for the preparation of an abrasive tool, especially an abrasive wheel. In an exemplary preparation, a conventional magnesium oxychloride cementious composition is formulated, and graphite is incorporated according to the present invention. Any graphite flake in excess of about 10% by weight of the calcined magnesium oxide component, may be substituted a) on a 1:1 weight basis for the magnesium oxide powder component; 2) on a 1:1 weight basis for any clay component, if present; 3) on a 1:1 weight basis for any combined total amount of clay and magnesium oxide, for example, a substitution of ¾ parts by weight clay and ¼ parts by weight magnesium oxide for 1 part by weight graphite; or 4) on a 1:1 weight basis for any combined total amount of magnesium oxide and/or clay and/or other filler, as useful for improving the product or the process of making the product. In general, amounts of graphite below about 10% by wt of MgO will rarely require adjustment of a given basic magnesium oxychloride cementitious formula by substitution of graphite for MgO, clay or other filler. The composition is then cured to harden as known in the art.

As discussed above, from about 10 to 30 wt % graphite based on the weight of the magnesium oxide employed will generally prove suitable for many dry-grinding applications, particularly the dry-grinding of coil springs; however, if desirable, the graphite content can be increased up to about at least about 50% by weight MgO, without compromising structural integrity of the tool. Again, at higher filler concentrations, including graphite, for example, in excess of about 30 wt % graphite based on the weight of the MgO content, coarser graphite flake components such as from about 50 to 150 mesh (ANSI screen size) may prove desirable to retain a workable composition; otherwise, it is usually preferred to use finer graphite particles, for example, from about 150 to about 350 mesh, particularly from about 300 to 350 mesh for good dispersion with the calcined magnesium oxide powder.

Abrasive material, such as fused aluminum oxide, is incorporated in an amount sufficient for the abrasive application, as in known formulations. From about 500 wt % MgO to about 1000 wt % MgO abrasive is usual. The graphite is compatible with the abrasives, and reduction in abrasive grit content to accommodate the graphite content is not necessary. As a result, the abrasive bond retains full efficacy for grinding applications, while the graphite component provides a cooler grinding environment. This promotes improved quality in the components ground, with less burn, less adverse metallurgical effects, less induced stress in the workpiece, and greater durability of the tool. The graphite also strengthens the tool, so that grinding tools according to this invention have greater heat strength, retaining a higher percentage of strength when heated, as compared to conventional magnesium oxychloride cement grinding tools. The tools accordingly have less tendency to develop heat fractures in use.

Flexural strength is used in the below Examples as a reflection of changes in heat strength of the magnesium oxychloride cement with graphite content; however, other factors which vary with changes in heat strength of the material may also be used for evaluating the effect of graphite size and/or content on heat strength in a given application.

In a convenient method for preparation of an abrasive tool, as exemplified by a wheel, the dry ingredients are admixed as described above, followed by addition of the liquid ingredients with thorough mixing. Typically, the dry ingredients will include magnesium oxide powder, the selected abrasive grit(s), the graphite component, and any selected additional dry additives. The powdered admixture is then combined with an aqueous solution of magnesium chloride, according to the above-suggested guidelines or other suitable recipe. The consistency of the mixture may be adjusted by further incremental addition of magnesium chloride solution, or by water alone, for optimal curing of the tool as known in the art. Alternatively, magnesium chloride may be added in dry form to the pre-mix, followed by addition of water as necessary. For abrasive wheels, the consistency of the magnesium oxychloride cementitious composition is adjusted as necessary to a stiffness suitable for compacting in a wheel-shaped mold, as known in the art.

The magnesium oxychloride cementitious composition is then placed, for example, into a wheel mold, and tamped to compact. The mold may be prepared prior to use with inserted nuts, cups, dowel caps, wire mesh or other elements known in the art, particularly a nut as known in the trade for a nut-inserted abrasive disc product. Other preparations of the molds, including those described supra, may be employed. The molded product is then allowed to set and harden, under conventional cure cycles.

The following Examples are illustrative of the invention.

EXAMPLES

Example I

Effect of Graphite on Magnesium Oxychloride Compositions Containing Clay

The basic magnesium oxychloride cementitious compositions of this Example comprised the following formulation:

TABLE I

| Ingredient | Amount (gm) |
|---|---|
| Brown aluminum oxide (#24) | 677.6 |
| White aluminum oxide (#24) | 607.6 |
| Brown aluminum oxide (#36) | 185.6 |
| White aluminum oxide (#36) | 166.2 |
| 25-0 [Homogeneous mixture of MgO (200.2 g) and alumina-silicate clay (50 g)] | 250.2 |
| L-30 (Aqueous MgCl$_2$ solution) | 200.2 |

Note: In this and the following examples: L-30 is a 29 wt % magnesium chloride aqueous solution (30 Baumé), available from Dow Chemical, Midland Mich. USA; # refers to ANSI screen size; the aluminum oxide frits are available from Norton Abrasives, Worcester, Mass. USA Twelve of these compositions were prepared, with incorporation of graphite to provide compositions as follows Table Ia):

TABLE Ia

EFFECT OF GRAPHITE ON Magnesium Oxychloride COMPOSITIONS CONTAINING CLAY

| Sample | AA (Control) | A | B | C | D | EE (Control) | F | G | H | I | J |
|---|---|---|---|---|---|---|---|---|---|---|---|
| Amount of Graphite (g) | — | 2.0 | 4.0 | 6.0 | 10.0 | — | 15.0 | 20.0 | 30.0 | 40.0 | 50.0 |
| % Graphite (by wt. MgO) | — | 1 | 2 | 3 | 5 | — | 7.5 | 10 | 15 | 20 | 25 |

Samples EE-H were each prepared from a basic magnesium oxychloride composition identical to that above which was used to prepare each of the Samples AA-D, except 5% less L-30 was included (190.2 g instead of 200.2 g). Samples I and J were prepared from the same basic composition, but 220.2 g L-30 were used instead of 200.2 g.

These adjustments were made to obtain a mix having good plasticity. Less liquid was used in the more heavily loaded samples as with the increase in graphite the mixes became wetter.

The samples were prepared by admixing the dry ingredients of the basic composition (magnesium oxide powder, clay, and aluminum oxide grit) with the selected portions of graphite, except for the control samples AA & EE, to which no graphite was added. L-30 was then gradually added with thorough mixing to obtain a plastic, settable mass suitable for molding. Six bars (5.5"×1.25"×1.0") of each sample were molded and cured in a dry room at room temperature. Three bars of each sample were broken after 15 days of curing and tested for flexural strength (FS) and elasticity (E. Mod.). Density was also calculated. The three remaining bars of each sample were cured for an additional 15 days under the same conditions and similarly tested.

The results are set forth in Tables Ib and Ic, below; the values in this and the following Tables for flexural strengths (flex strength) and the standard deviation from these values are in psi; the values for the elasticity modulus (e-mod) and standard deviations from these values are in kN/mm$^2$; and both the flexural strength and elasticity modulus values are averages of the values obtained for the bars of each sample tested in each run.

TABLE Ib

GRAPHITE LOADING OF Magnesium Oxychloride

| Sample | AA CONTROL | A: 1% GRAPHITE BY WT MgO | B: 2% GRAPHITE BY WT MgO | C: 3% GRAPHITE BY WT MgO | D: 5% GRAPHITE BY WT MgO |
|---|---|---|---|---|---|
| 15 DAY BREAKS | | | | | |
| FLEX STRENGTH | 3230 | 3302 | 3615 | 3089 | 3541 |
| STD | 235 | 209 | 349 | 348 | 275 |
| E-MOD | 69.0 | 71.1 | 73.0 | 64.9 | 74.0 |
| STD | 2.4 | 1.3 | 1.9 | 5.9 | 2.2 |
| DENSITY | 2.668 | 2.655 | 2.676 | 2.589 | 2.672 |
| 30 DAY BREAKS | | | | | |
| FLEX STRENGTH | 3373 | 3550 | 3467 | 3564 | 3570 |
| STD | 240 | 264 | 450 | 190 | 395 |
| E-MOD | 72.0 | 69.2 | 72.5 | 71.6 | 74.1 |
| STD | 3.6 | 2.2 | 2.3 | 5.5 | 3.1 |
| DENSITY | 2.683 | 2.635 | 2.672 | 2.64 | 2.668 |

NOTE: AS THE AMOUNT OF GRAPHITE INCREASED, THE MIXES BECAME WETTER AND THE BARS WERE EASIER TO REMOVE FROM THE MOLD

TABLE Ic

| Sample | AA CONTROL | F: 7.5% GRAPHITE BY WT MgO | G: 10% GRAPHITE BY WT MgO | H: 15% GRAPHITE BY WT MgO | I: 20% GRAPHITE BY WT MgO | J: 25% GRAPHITE BY WT MgO |
| --- | --- | --- | --- | --- | --- | --- |
| GRAPHITE LOADING OF Magnesium Oxychloride | | | | | | |
| 15 DAY BREAKS | | | | | | |
| FLEX STRENGTH | 3531 | 3678 | 3609 | 3466 | 3784 | 3761 |
| STD | 149 | 147 | 299 | 213 | 219 | 400 |
| E-MOD | 67.8 | 68.3 | 71.2 | 66.5 | 73.8 | 74.4 |
| STD | 0.7 | 0.6 | 2.2 | 1.0 | 4.0 | 1.4 |
| DENSITY | 2.655 | 2.626 | 2.643 | 2.607 | 2.680 | 2.690 |
| 30 DAY BREAKS | | | | | 51 DAY BREAKS | |
| FLEX STRENGTH | 3174 | 3552 | 3720 | 3268 | 3817 | 3984 |
| STD | 415 | 169 | 298 | 392 | 600 | 593 |
| E-MOD | 68.1 | 67.1 | 71.8 | 66.5 | 73.5 | 75.9 |
| STD | 1.5 | 1.8 | 3.8 | 4.9 | 4 | 4.7 |
| DENSITY | 2.642 | 2,627 | 2.636 | 2.573 | 2.672 | 2.694 |

Example II

Effect of Graphite on Heat Strength of Magnesium Oxychloride Bonds Containing no Clay 1. Six bars of magnesium oxychloride cement bond of the following composition containing no clay component were prepared as in Example I:

TABLE IIa

| INGREDIENTS | WT IN g |
| --- | --- |
| #24 GS (Brown Aluminum Oxide) | 677.6 |
| #24 WA (White Aluminum Oxide) | 607.0 |
| #36 GS (Brown Aluminum Oxide) | 185.6 |
| #36 WA (White Aluminum Oxide) | 166.2 |
| MgO (Calcined) | 200.2 |
| L-30 (Aqueous MgCl$_2$ solution) | 220.2 |
| GRAPHITE* | 100.1 |

*Crystalline flake graphite, 15 g, 96% purity. Superior Graphite Company, Chicago, IL, USA.

Flexural strength and elasticity were determined as in Example I. The results after 15 and 51 days were as follows:

TABLE IIb

| | 15 day break | 51 day break |
| --- | --- | --- |
| Flex Strength | 3541 | 3497 |
| E-Mod | 70.0 | 73.2 |
| Density | 2.641 | 2.651 |

2. The flexural strength and elasticity of the bars was compared to magnesite silver rim bonds according to the formulation of Table IIa but containing varying amounts of abrasive and MgO, and no graphite. The silver rim bonds were prepared and tested as in Example I. The Table IIc reflects the low flexural strengths of these bonds 1–5 even in the absence of heat (control) as compared to the graphite-containing bonds of Table IIb. Table IIc also reflects the sharp decrease in the original flexural strength of these bonds under applied heat/time parameters.

TABLE IIc

HEAT STRENGTH RETENTION OF SILVER RIM BONDS

| HEATING REGIMEN | SAMPLE | | | | |
| --- | --- | --- | --- | --- | --- |
| | 1 | 2 | 3 | 4 | 5 |
| None (Control) | | | | | |
| Flexural Strength (PSI) | 1441 | 1698 | 2069 | 2251 | 2834 |
| Std. Dev. (PSI) | 74 | 93 | 95 | 97 | 242 |
| E-mod. (kN/mm$^2$) | 60.4 | 42.7 | 50.3 | 50.8 | 65.5 |
| Std. Dev. (kN/mm$^2$) | 3.1 | 1.5 | 1.1 | 0.9 | 2.0 |
| 48 hrs. @ 150° F. | | | | | |
| Flexural Strength (PSI) | 917 | 1060 | 1853 | 1712 | 1654 |
| Std. Dev. (PSI) | 61 | 73 | 253 | 134 | 195 |
| E-mod. (kN/mm$^2$) | 26.4 | 30.1 | 46.1 | 44.9 | 46.0 |
| Std. Dev. (kN/mm$^2$) | 0.6 | 2.0 | 1.6 | 0.7 | 4.9 |
| 8 hrs. @ 250° F. | | | | | |
| Flexural Strength (PSI) | 868 | 1183 | 1392 | 1317 | 1326 |
| Std. Dev. (PSI) | 54 | 69 | 97 | 64 | 44 |
| E-mod. (kN/mm$^2$) | 19.6 | 29.4 | 34.3 | 26.3 | 35.6 |
| Std. Dev. (kN/mm$^2$) | 0.5 | 2.0 | 0.9 | 1.3 | 5.9 |
| 8 hrs. @ 390° F. | | | | | |
| Flexural Strength (PSI) | 486 | 715 | 1017 | 973 | 1531 |
| Std. Dev. (PSI) | 50 | 74 | 125 | 91 | 104 |
| E-mod. (kN/mm$^2$) | 12.7 | 18.2 | 21.8 | 21.6 | 37.4 |

TABLE IIc-continued

HEAT STRENGTH RETENTION OF SILVER RIM BONDS

| HEATING REGIMEN | SAMPLE | | | | |
|---|---|---|---|---|---|
| | 1 | 2 | 3 | 4 | 5 |
| Std. Dev. (kN/mm$^2$) | 0.7 | 0.8 | 0.6 | 2.2 | 0.7 |

Example III

Comparison of Flexural Strength and Elasticity in Graphite-Filled Magnesite Bars without Clay Samples of graphite-filled magnesium oxychloride compositions and a control composition containing no graphite were formulated as set forth in Table IIIa below (parts are in parts by weight). Three sets of magnesite bars (bars made with magnesium oxychloride as the bonding agent) were prepared for each formulation as described in Example I. The control sample A contained equal parts by weight L-30 magnesium chloride solution and calcined magnesium oxide. Sample B contained L-30 in 5 wt % excess over MgO, and graphite in an amount of 12.5 wt % MgO. In Sample C, the MgO content was decreased in equal parts by weight of the added graphite, while the L-30 was kept at a 5 wt % excess over MgO. The product bars were tested for flexural strength and elasticity as in Example I (5 day breaks only).

TABLE IIIa

GRAPHITE FILLED MAGNESITE BARS WITHOUT CLAY FLAKE

| Sample | A-Control | B | C |
|---|---|---|---|
| Formulation | 100 PARTS MgO | 100 PARTS MgO | 87.5 PARTS MgO |
| | 0 PARTS FLAKE | 0 PARTS FLAKE | 0 PARTS FLAKE |
| | 0 PARTS GRAPHITE | 12.5 PARTS GRAPHITE | 12.5 PARTS GRAPHITE |
| | 100 PARTS L-30 | 105 PARTS L-30 | 91.9 PARTS L-30 |
| FS (psi) | 1287 (105) | 1446 (142) | 1208 (129) |
| E-MOD (kN/mm$^2$) | 36.8 (2.7) | 37.5 (2.3) | 33.5 (2.0) |
| DENSITY | 2.67 | 2.54 | 2.50 |
| MIX CONDITION | DRY | GOOD | GOOD |

Numbers in parentheses in Tables IIIA and IVa are standard deviations.

As can be seen from the Table, the inclusion of 12.5 pbw graphite in Sample B significantly improved heat strength of the bars as compared to the control. Substitution of the added 12.5 wt % graphite for an equal wt. portion of MgO (Sample C) substantially nullified this improvement.

Example IV

Comparison of Flexural Strength and Elasticity in Graphite-Filled Magnesite Bars with Clay Samples of graphite-filled magnesium oxychloride compositions and a control composition containing no graphite were formulated as set forth in Table IVA, below (parts are in parts by weight). Three sets of magnesite bars were prepared for each formulation as described in Example I. The control sample A contained equal parts by weight MgO and L-30, 37.5 wt. % clay flake based on the amount of MgO, and no graphite. Sample B was the same as Sample A, except it contained 12.5 wt. % graphite based on the amount of MgO. Sample C was the same as Sample B except it contained 25 wt % graphite based on the amount of MgO, half of which was substituted for the clay in sample B on an equal parts by wt basis. Sample C also contained a 10 wt % excess based on the weight of MgO of L-30 over Sample B. The samples were cast into bar molds and tested for flexural strength as described in Example I (15 day breaks only).

TABLE IVa

GRAPHITE FILLED Magnesium Oxychloride

| Sample | A | B | C |
|---|---|---|---|
| Formulation | 100 PARTS MgO | 100 PARTS MgO | 100 PARTS MgO |
| | 37.5 PARTS FLAKE | 25 PARTS FLAKE CLAY | 25 PARTS FLAKE CLAY |
| | 12.5 PARTS GRAPHITE | 25 PARTS GRAPHITE | 25 PARTS GRAPHITE |
| FS (psi) | 3438 (206) | 3929 (351) | 3522 (147) |
| E-MOD (kN/mm$^2$) | 71.6 (.9) | 73.3 (1.7) | 69.0 (2.3) |
| DENSITY | 2.60 | 2.59 | 2.62 |
| MIX CONDITION | DRY | DRY | GOOD |

As can be seen from the Table, inclusion of 12.5 parts by weight graphite substantially increased the flexural strength of the control sample A. Sample C, containing 25 wt % graphite and 12.5 wt % less clay than the control also showed an increase in flexural strength, and good consistency of the mix.

Example V

Field Testing of Graphite-Filled Magnesite Abrasive Discs

Two sets of two nut inserted abrasive discs were prepared from the conventional magnesium oxychloride composition except one set containing 12.5 wt % graphite and the other containing 25 wt % graphite based on the weight of MgO.

Again, the dry ingredients of each formulation were first admixed, followed by addition of the L-30 with thorough mixing. The resultant plastic masses were tamped into 4 nut inserted wheel molds and cured in a dry room at room temperature for 30 days.

The cured, graphite-filled discs were field tested in a conventional dry grinding application employing coil springs as workpieces for a period of about one week.

As compared to standard magnesium oxychloride cement-bonded abrasive discs of the same formulation with no added graphite, the graphite-filled magnesium oxychloride discs ground cooler, as evidenced by minimal burn of the springs, and had an average increased wheel life of about 25%. Much less cracking of the discs occurred, and dressing of the discs was required much less frequently.

Example VI

Magnesium Oxychloride Bonds Modified with Wax Beads

Wax beads are known in the grinding industry as additives for abrasive tool binder compositions such as phenol-formaldehyde binder compositions. The wax beads function as lubricants, reducing grinding temperatures and increasing tool durability.

The purpose of this experiment was to test the efficacy of wax beads on magnesium oxychloride abrasive bonds.

Carnauba wax beads were obtained from Bjorksten Laboratories, Madison, Wis., USA. The beads were white and rather lumpy.

The wax beads were added to a basic magnesium oxychloride formulation as set forth in Table VIa by first blending the beads with the MgO powder and abrasive grit, followed by addition of the L-30 with thorough mixing. Six bars were molded for each formulation (1%, 2%, and 5% wax, and no wax) and cured in a dry room at room temperature.

TABLE VIa

| 6½ bar formulation | |
|---|---|
| #24 BB (aluminum oxide abrasive) | 1325.3 g |
| #36 BB (aluminum oxide abrasive) | 351.1 g |
| Calcined MgO Powder | 200.6 g |
| L-30 | 210.6 g |
| Wax Beads | 1% = 2.0 g; 2% = 4.0 g; 5% = 10.0 g |
| 24 Bars @ 5.5" × 1.25" × 1.0" prepared | |

Three bars of each formulation were broken after 15 days of curing, and the remaining three bars broken after an additional 15 days of curing. The average flexural strengths of each run are set forth in Table VIb:

TABLE VIb

| Sample | 15 Day F.S. (psi) | 30 Day F.S. (psi) |
|---|---|---|
| Control | 2263 | 2545 |
| 1% Wax (wt % based on Mgo) | 2141 | 1942 |
| 2% Wax (wt % based on Mgo) | 1935 | 1789 |
| 5% Wax (wt % based on Mgo) | 1536 | 1546 |

As is apparent from Table VIb, the flexural strengths of the bars decreased sharply with increasing wax content. Further, it was considered that sufficient lubrication for significantly cooler grinding would not be obtained even at the highest (5%) wax content.

What is claimed is:

1. A magnesium oxychloride cement bond containing graphite in the amount of at least about 5% by weight based on the MgO content of the bond.

2. The bond of claim 1, further containing an abrasive material, in an amount sufficient to effectively abrade a workpiece.

3. An abrasive tool comprising a magnesium oxychloride cement bond containing graphite in the amount of at least about 5% by weight based on the MgO content of the bond, and an abrasive material in an amount sufficient to effectively abrade the workpiece.

4. An abrasive tool according to claim 3, wherein the tool is an abrasive wheel.

5. An abrasive wheel according to claim 4, wherein the wheel is a nut-inserted abrasive disc.

6. The bond of claim 1, wherein the graphite is present in an amount sufficient to increase heat strength of the bond.

7. The bond of claim 6, wherein the graphite is present in an amount of from about 10 wt % based on the MgO content of the bond, to about equal parts by weight graphite and MgO.

8. The bond of claim 7, wherein the graphite is present in an amount of from about 10 wt % to about 50 wt % based on the MgO content of the bond.

9. The abrasive tool of claim 3, wherein the graphite is present in a lubricant-effective amount insufficient to impair the heat strength of the bond.

10. The abrasive tool of claim 9, wherein an increase in heat strength of the bond is measured by an increase in flexural strength of the bond.

11. The abrasive tool of claim 3, wherein the abrasive material is an abrasive grit present in an amount sufficient to effectively abrade the workpiece.

12. The abrasive tool of claim 11, wherein the abrasive grit is present in an amount of from about 500 wt % to about 1000 wt % based on the amount of MgO present in the bond.

13. The abrasive tool of claim 11, wherein the abrasive grit comprises aluminum oxide grit.

14. The abrasive tool of claim 11, wherein the abrasive tool is an abrasive wheel.

15. The abrasive tool of claim 13, wherein the abrasive tool is a nut-inserted abrasive disc.

16. The abrasive tool of claim 3, containing sufficient graphite to substantially maintain or increase flexural strength of the bond under heat and sufficient abrasive material to abrade a workpiece.

17. The abrasive tool of claim 16, wherein the graphite is present in an amount of at least about 10 wt % based on the MgO content of the bond.

18. The abrasive tool of claim 16, wherein graphite is present in a lubricant-effective amount.

19. The abrasive tool of claim 17, wherein the graphite is present in an amount up to about 50% by wt based on the MgO content of the bond.

20. The abrasive tool of claim 18, wherein the graphite is flake graphite.

21. The abrasive tool of claim 20, wherein the graphite flake is from about 15 microns to about 200 mesh (ANSI) in size.

22. The abrasive room of claim 20, wherein the graphite is present in an amount of from about 10 wt % to about 30 wt % based on the MgO content of the bond, and is from about 150 to about 350 mesh ANSI screen size.

23. The abrasive tool of claim 22, wherein the tool is an abrasive wheel.

24. The abrasive tool of claim 23, wherein the wheel is a nut-inserted abrasive disc.

25. The abrasive tool of claim 18, further including a clay component in an amount sufficient to increase flexural strength of the tool.

26. The abrasive tool of claim 25, wherein the clay is present in an amount of from about 5 to about 75 wt % based on the MgO content of the bond.

27. The abrasive tool of claim 26, wherein the graphite is present in an amount from about 10 to 30% by weight based on the MgO content of the bond.

28. The abrasive tool of claim 25, wherein the clay component is an aluminum-silicate clay.

29. The abrasive tool of claim 28, wherein the graphite is a flake graphite.

30. The abrasive tool of claim 29, wherein the graphite is from about 15 microns to about 200 mesh (ANSI) in size.

31. The abrasive tool of claim 29, wherein the graphite is present in an amount from about 5 wt % to about 30 wt % based on the MgO content of the bond, and is from about 300 to about 350 mesh, ANSI screen size.

32. The abrasive tool of claim 30, wherein the tool is an abrasive wheel.

33. The abrasive wheel of claim 32, wherein the tool is a nut-inserted abrasive disc.

34. The abrasive tool of claim 31, wherein the graphite is present in an amount greater than about 30 wt % based on the MgO content of the bond, and is coarser than about 150 mesh.

35. The abrasive tool of claim 29, wherein the graphite comprises flake graphite in an amount greater than about 30 wt % MgO, and is from about 50 to about 150 mesh ANSI screen size.

36. The abrasive tool of claim 35, wherein the abrasive tool is an abrasive wheel.

37. In an abrasive tool of a given flexural strength under heat load comprising a clay-loaded, abrasive-containing magnesium oxychloride bond, the improvement comprising incorporating a graphite component into the bond in an amount of at least about 5% by wt based on the MgO content of the bond.

38. The abrasive tool of claim 37, wherein the clay component, or MgO component, or both is reduced as the graphite content is increased on an equal parts by weight basis.

39. The abrasive tool of claim 37, wherein the clay component or MgO component or both is reduced on an equal parts by weight basis for any amount of graphite in excess of about 20 wt % based on the MgO content of the bond.

* * * * *